United States Patent
Hiramoto (10) Patent No.: US 10,618,385 B2
(45) Date of Patent: Apr. 14, 2020

(54) VEHICLE DOOR OPENING AND CLOSING APPARATUS

(71) Applicant: MITSUI KINZOKU ACT CORPORATION, Kanagawa (JP)

(72) Inventor: Shigenori Hiramoto, Kanagawa (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 480 days.

(21) Appl. No.: 15/321,095

(22) PCT Filed: Aug. 19, 2014

(86) PCT No.: PCT/JP2014/071677
§ 371 (c)(1),
(2) Date: Dec. 21, 2016

(87) PCT Pub. No.: WO2016/006122
PCT Pub. Date: Jan. 14, 2016

(65) Prior Publication Data
US 2017/0136857 A1     May 18, 2017

(30) Foreign Application Priority Data

Jul. 9, 2014 (JP) ................................. 2014-141630

(51) Int. Cl.
*B60J 5/06* (2006.01)
*E05B 83/40* (2014.01)
(Continued)

(52) U.S. Cl.
CPC ............. *B60J 5/062* (2013.01); *E05B 77/245* (2013.01); *E05B 77/265* (2013.01); *E05B 83/40* (2013.01); *E05B 79/12* (2013.01)

(58) Field of Classification Search
CPC ... Y10T 292/57; Y10T 292/85; Y10T 16/458; Y10T 292/0857; Y10T 292/0975;
(Continued)

(56) References Cited

U.S. PATENT DOCUMENTS 5,762,383 A * 6/1998 Gomi ...................... E05B 77/26
292/216
6,050,619 A * 4/2000 Arabia, Jr. ................ F16C 1/12
292/216
(Continued)

FOREIGN PATENT DOCUMENTS

JP        6-42247 A      2/1994
JP     2001-173291 A     6/2001
(Continued)

OTHER PUBLICATIONS

International Search Report issued in International Application No. PCT/JP2014/071677, dated Sep. 30, 2014, with English Translation.

*Primary Examiner* — Mark A Williams
(74) *Attorney, Agent, or Firm* — McDermott Will & Emery LLP (57) ABSTRACT

A vehicle door opening and closing apparatus includes: an input lever configured to rotate when door opening operation is performed on an inside door handle arranged inside a vehicle; and an output lever rotatably arranged on a base plate. By transmission of rotation of the input lever to the output lever when the input lever rotates along with the door opening operation on the inside door handle, a latch unit provided between a vehicle body and a door performs release operation to allow opening movement of the door with respect to the vehicle body. A sub plate is arranged on the base plate in a form of covering the baseplate, an input support shaft for supporting the inside door handle is rotatably arranged on the sub plate, and the input lever is
(Continued)

arranged on the input support shaft so as to integrally rotate with the input support shaft.

3 Claims, 11 Drawing Sheets

(51) Int. Cl.
*E05B 77/24* (2014.01)
*E05B 77/26* (2014.01)
*E05B 79/12* (2014.01)

(58) Field of Classification Search
CPC . Y10T 292/1055; E05B 81/16; E05B 77/265; E05B 85/12
See application file for complete search history.

(56) References Cited

U.S. PATENT DOCUMENTS

| | | | |
|---|---|---|---|
| 2005/0230982 A1* | 10/2005 | Lee | E05B 85/12 292/336.3 |
| 2006/0163883 A1 | 7/2006 | Hoshikawa et al. | |
| 2008/0022736 A1* | 1/2008 | Kouzuma | E05B 81/20 70/237 |
| 2009/0267354 A1* | 10/2009 | Donaldson | E05B 53/00 292/2 |

FOREIGN PATENT DOCUMENTS

| | | |
|---|---|---|
| JP | 2003-184396 A | 7/2003 |
| JP | 2003-328620 A | 11/2003 |
| JP | 2012-012810 A | 1/2012 |
| JP | 2013-002234 A | 1/2013 |

* cited by examiner

VEHICLE DOOR OPENING AND CLOSING APPARATUS

CROSS-REFERENCE TO RELATED APPLICATIONS

This application is the U.S. National Phase under 35 U.S.C. § 371 of International application No. PCT/JP2014/071677, filed on Aug. 19, 2014, which claims the benefit of Japanese Application No. 2014-141630, filed on Jul. 9, 2014, the entire contents of each are hereby incorporated by reference.

FIELD

The present invention relates to a vehicle door opening and closing apparatus, and in particular, to a vehicle door opening and closing apparatus applicable to a door slidably arranged with respect to a vehicle body.

BACKGROUND

A door slidably arranged with respect to a vehicle body is directly moved to be opened when release operation of a latch unit is performed, and thus an inside door handle is usually rotatably arranged about an axis that is along a left-right direction of a vehicle. For example, for a slide door that opens and closes a vehicle opening for getting on and off a rear seat of a vehicle, when an inside door handle is rotated to a rear side of the vehicle about an axis that is along a left-right direction of the vehicle, a latch unit is release operated, and if the slide door is then directly moved to a rear side of the vehicle via the inside door handle, the vehicle opening becomes open.

In a vehicle door opening and closing apparatus of this type, a power transmission mechanism called "remote control unit" is normally provided between an inside door handle and a latch unit. In the remote control unit, an input support shaft is installed to a base plate that becomes a base. This input support shaft is provided with an input lever. The input lever is connected with the latch unit by a power transmission member, and by being rotated when the inside door handle is operated, the input lever functions to transmit operation of the inside door handle to the latch unit (for example, see Patent Literature 1).

CITATION LIST

Patent Literature

Patent Literature 1: Japanese Patent Application Publication No. 2013-2234

SUMMARY

Technical Problem

In the above described remote control unit, since the input support shaft is in a cantilever state of protruding from the base plate, when the inside door handle is operated, the input support shaft may become inclined with respect to the base plate. In this case, operability for operating the inside door handle is affected. Such a problem is able to be solved by increasing plate thickness of the base plate. However, if the plate thickness of the base plate is increased, not only weight of the remote control unit is widely increased, but also formability of the base plate may be affected.

In view of the above circumstances, the present invention aims to provide a vehicle door opening and closing apparatus, which is able to prevent an input support shaft from becoming inclined when an inside door handle is operated, without increasing weight and affecting formability.

Solution to Problem

To achieve the above-described object, a vehicle door opening and closing apparatus according to the present invention includes: an input lever configured to rotate when door opening operation is performed on an inside door handle arranged inside a vehicle; and an output lever rotatably arranged on a base plate. By transmission of rotation of the input lever to the output lever when the input lever rotates along with the door opening operation on the inside door handle, a latch unit provided between a vehicle body and a door performs release operation to allow opening movement of the door with respect to the vehicle body. A sub plate is arranged on the base plate in a form of covering the baseplate, an input support shaft for supporting the inside door handle is rotatably arranged on the sub plate, and the input lever is arranged on the input support shaft so as to integrally rotate with the input support shaft.

In the vehicle door opening and closing apparatus according to the present invention, the sub plate is installed, together with the base plate, to a panel of the door.

In the vehicle door opening and closing apparatus according to the present invention, the input support shaft: has a protruding portion extending through the sub plate and between the sub plate and the base plate; includes a shaft interlocking member that is provided on the protruding portion and integrally rotates with the input support shaft; and rotatably supports the input lever, and. The input lever is caused to rotate integrally with the input support shaft by the shaft interlocking member being engaged with the input lever.

Advantageous Effects of Invention

According to the present invention, since an input support shaft is installed to a base plate via a sub plate, the whole length of the input support shaft is able to be shortened, and even if plate thickness of the base plate is not increased, the input support shaft is able to be prevented from becoming inclined when an inside door handle is operated. What is more, the sub plate may just have a size covering a part of the base plate and there is no risk that the weight will be increased.

DESCRIPTION OF EMBODIMENTS

Hereinafter, preferred embodiments of a vehicle door opening and closing apparatus according to the present invention will be described in detail with reference to the appended drawings.

Figure 1:
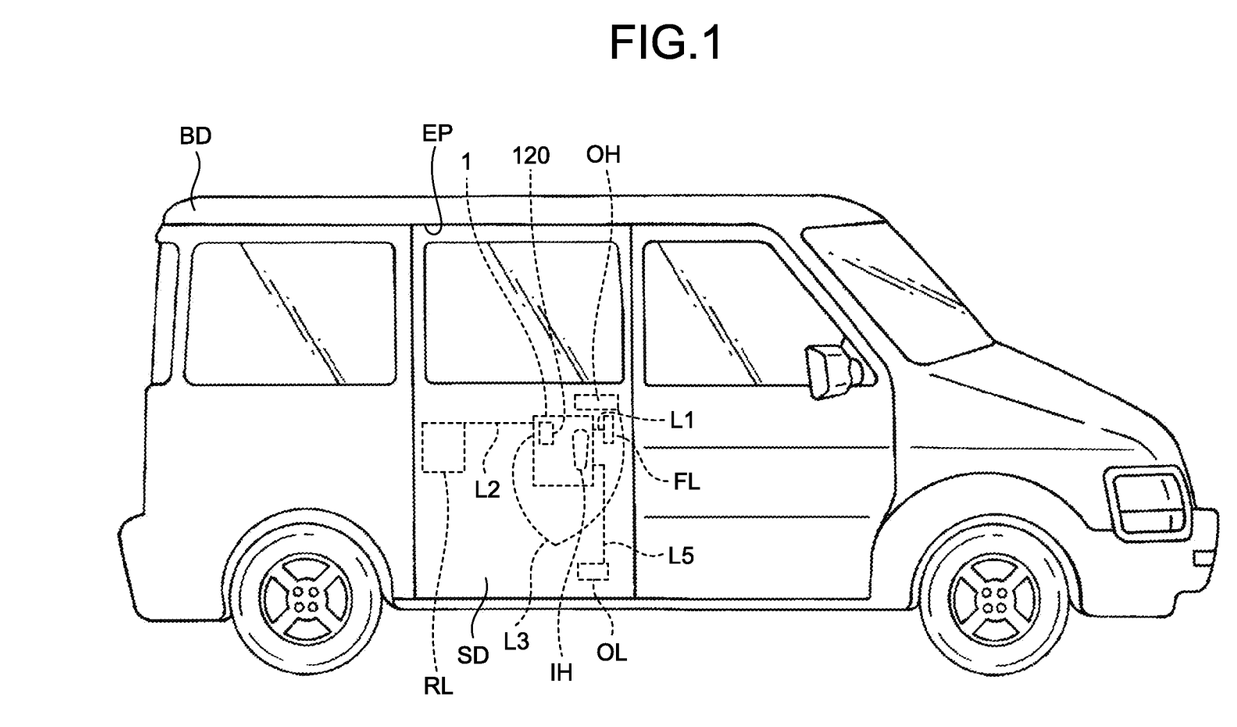
FIG. 1 is a side view of a vehicle, to which a door opening and closing apparatus that is an embodiment of the present invention has been applied.

FIG. 1 schematically illustrates a vehicle, to which a door opening and closing apparatus that is an embodiment of the present invention has been applied. The vehicle exemplified herein is a four-wheeled vehicle, which has an entrance EP to a rear seat on a right side of a vehicle body BD and has a slide door SD that slides back and forth to open and close this entrance.

The door opening and closing apparatus that performs control for opening and closing the slide door SD with respect to the vehicle body BD includes a front fully closing latch unit FL, a rear fully closing latch unit RL, a fully opening latch unit OL, and a control unit 1. The front fully closing latch unit FL and the rear fully closing latch unit RL are each for maintaining a state where the slide door SD has been closed with respect to the vehicle body BD. The front fully closing latch unit FL is provided between a front portion of the slide door SD and the vehicle body BD and the rear fully closing latch unit RL is provided between a rear portion of the slide door SD and the vehicle body BD. The fully opening latch unit OL is for maintaining a state where the slide door SD has been opened with respect to the vehicle body BD. Each of these front fully closing latch unit FL, rear fully closing latch unit RL, and fully opening latch unit OL has a configuration similar to that of a conventional one, and may be configured to include, for example, a latch that engages with a striker provided in the vehicle body BD and a ratchet that controls movement of the latch.

The control unit 1 operates when an outside door handle OH of the slide door SD is operated or when an inside door handle IH of the slide door SD is operated, and is for causing release operation of the front fully closing latch unit FL, the rear fully closing latch unit RL, and the fully opening latch unit OL.

Figure 2:
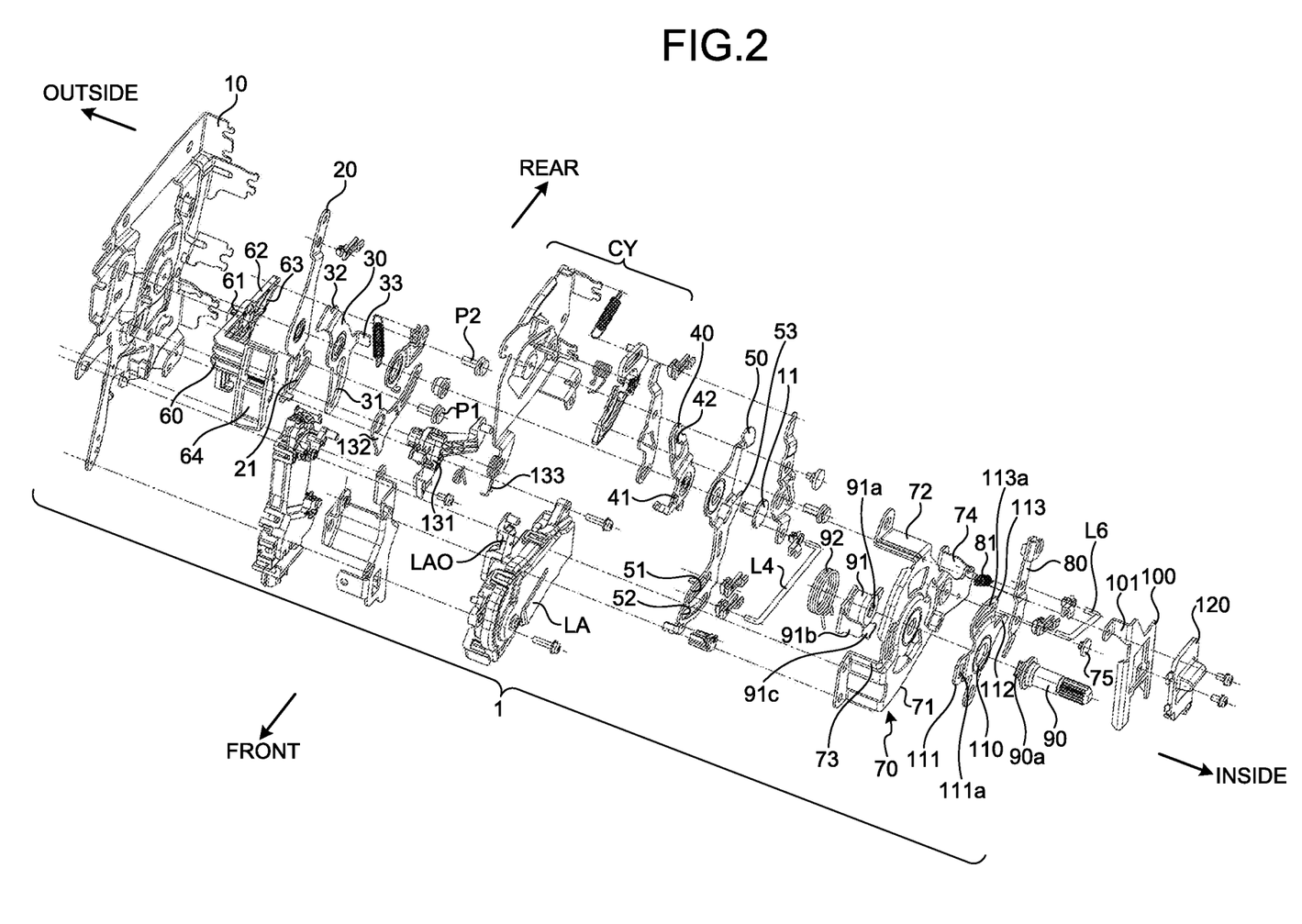
FIG. 2 is an exploded perspective view of the door opening and closing apparatus applied to the vehicle illustrated in FIG. 1.
Figure 3:
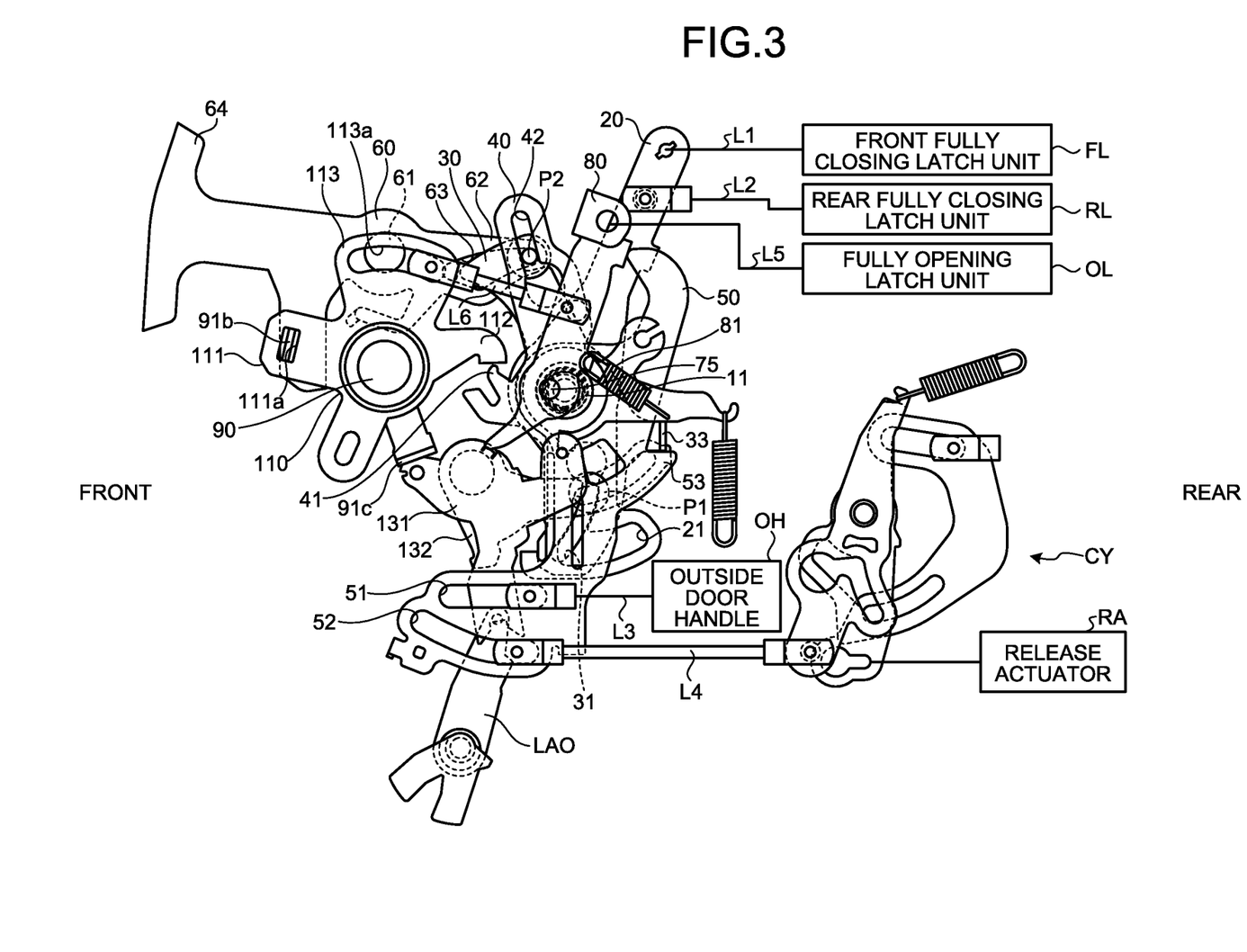
FIG. 3 is a diagram of a configuration of main parts of the door opening and closing apparatus illustrated in FIG. 2 as viewed from inside of the vehicle.
Figure 5:
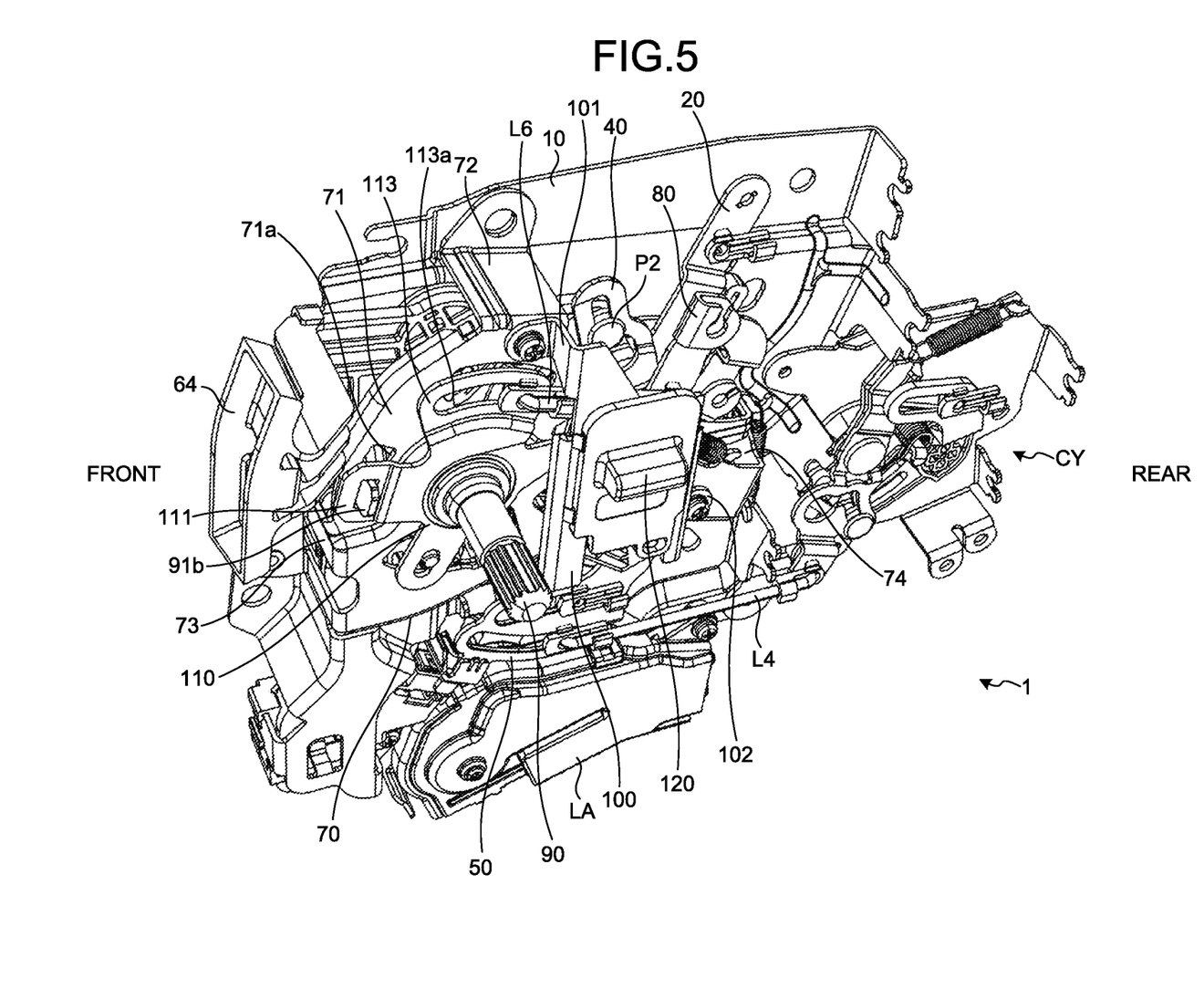
FIG. 5 is a perspective view of the door opening and closing apparatus illustrated in FIG. 2 as viewed from the inside.
Figure 6:
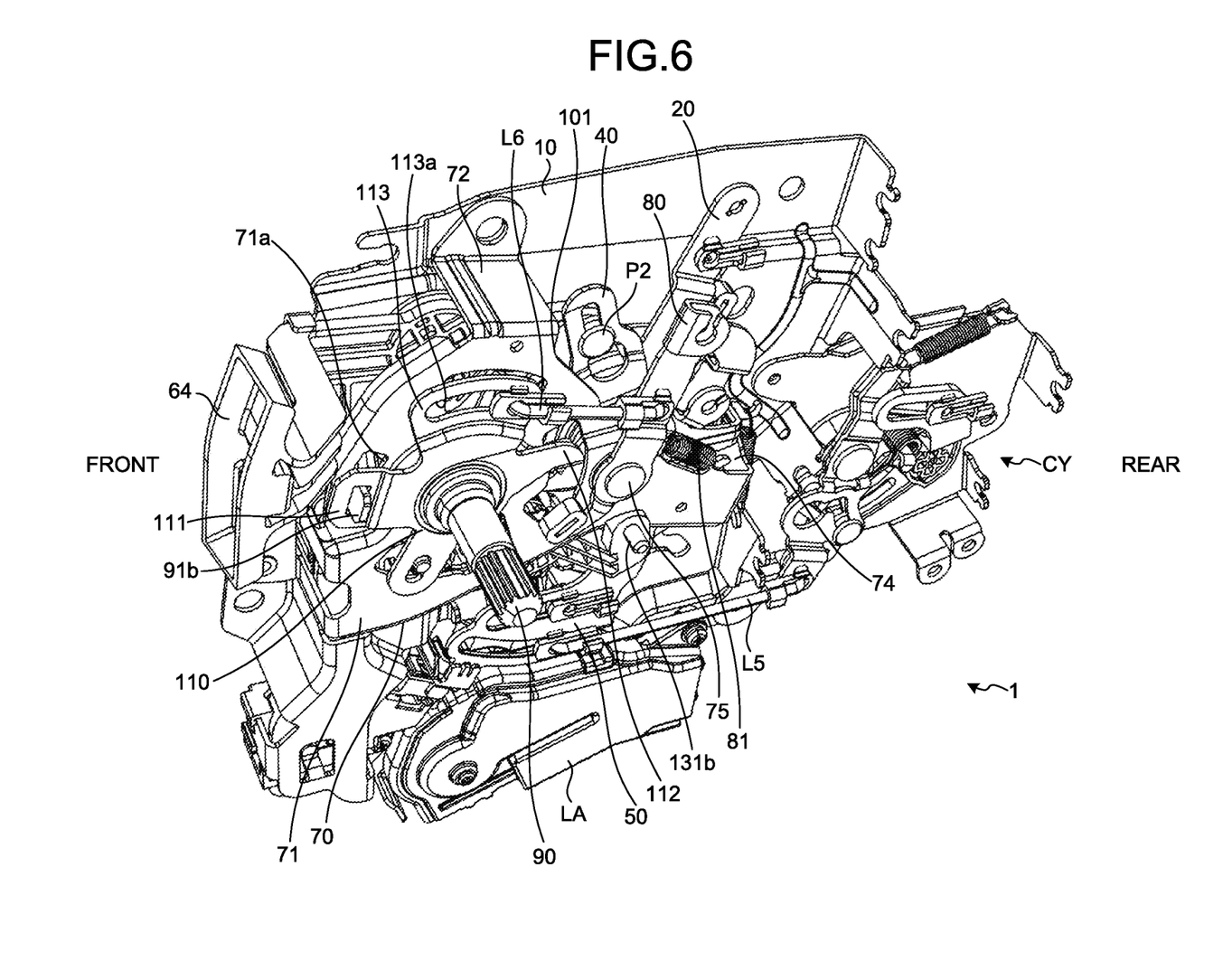
FIG. 6 is a perspective view of a state where a knob plate has been removed from the door opening and closing apparatus illustrated in FIG. 5.

FIG. 2, FIG. 3, and FIG. 5 illustrate a configuration example of the control unit 1 applied in this embodiment. The control unit 1 exemplified herein: has a base plate 10 that becomes a base; is installed on a surface of an inner panel (not illustrated in the figures) of the slide door SD via this base plate 10, the surface being on an inner side of the vehicle; and has a fully closing release shaft 11 on the base plate 10. The fully closing release shaft 11 protrudes towards inside of the vehicle along the left-right direction of the vehicle from the base plate 10. This fully closing release shaft 11 rotatably supports, towards the inside of the vehicle, a release lever (output lever) 20, a connect lever 30, an inside open lever 40, and an outside handle lever 50.

Figure 4:
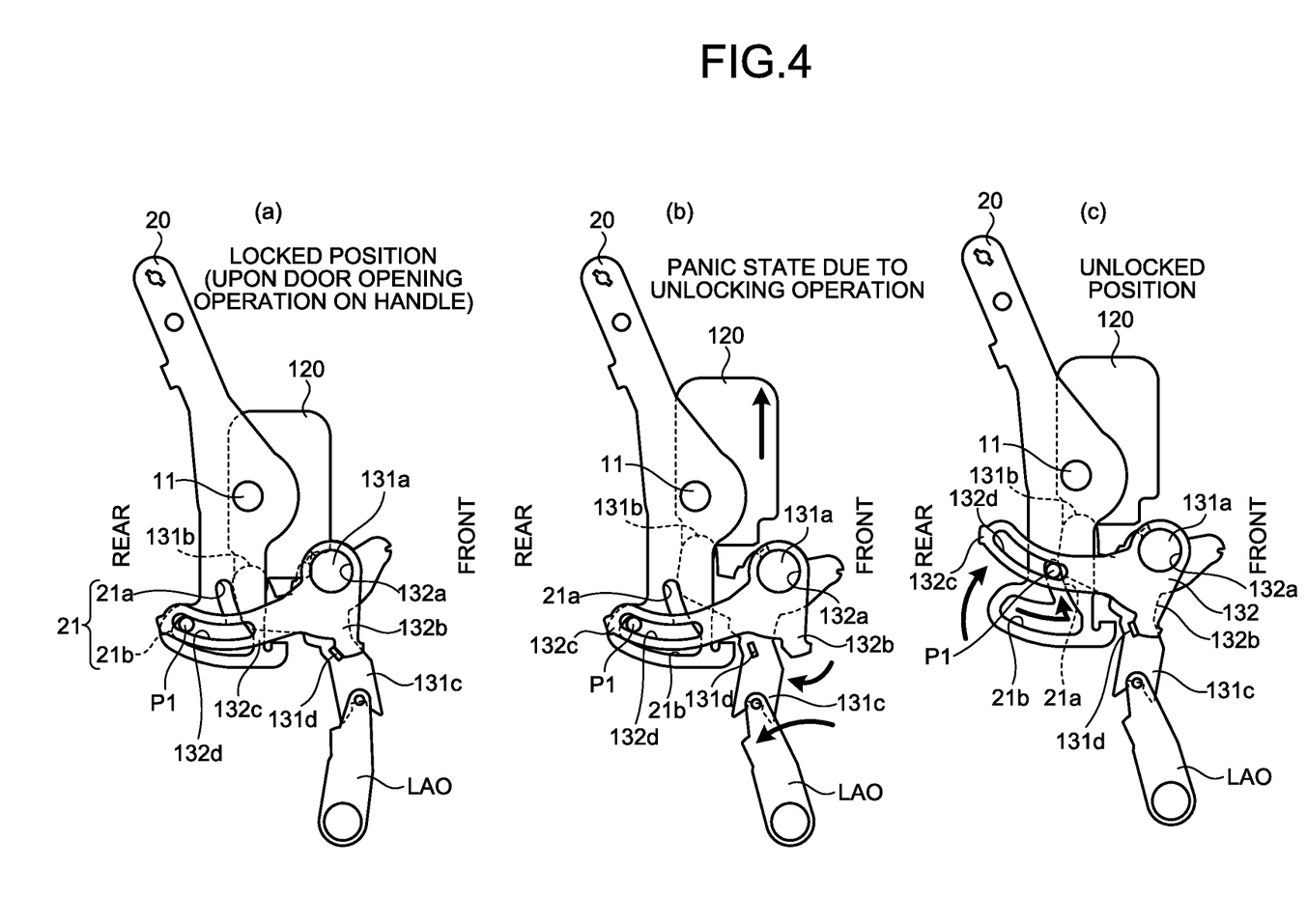
FIG. 4 is a lock mechanism applied to the door opening and closing apparatus illustrated in FIG. 2 as viewed from outside of the vehicle, (a) being a side view of a case where door opening operation is performed in a state where a lock knob is arranged at a locked position, (b) being a side view of a case where the lock knob has been moved to an unlocked position in a state where the door opening operation has been performed, and (c) being a side view of a state where the door opening operation has been stopped from the state illustrated in (b).

The release lever 20 is arranged to extend substantially vertically with respect to the fully closing release shaft 11. An end portion of this release lever 20, the end portion being positioned upper than the fully closing release shaft 11, is connected to a first link member L1 and a second link member L2, and a lock control hole 21 is provided at an end portion of the release lever 20, the end portion being positioned lower the fully closing release shaft 11. The first link member L1 connects to the front fully closing latch unit FL and the second link member L2 connects to the rear fully closing latch unit RL. In this embodiment, the first link member L1 and the second link member L2 are respectively connected to their fully closing latch units FL and RL such that when the release lever 20 rotates anticlockwise in FIG. 3, both of the front fully closing latch unit FL and the rear fully closing latch unit RL perform release operation. The lock control hole 21 forms, as illustrated in FIG. 4(*a*), an approximate L-shape in which an unlock portion 21*a* extending substantially in a radial direction with respect to the fully closing release shaft 11 and a lock portion 21*b* extending substantially in a circumferential direction towards the rear of the vehicle from a lower end of the unlock portion 21*a* are continuous with each other.

The connect lever 30 is, as illustrated in FIG. 2 and FIG. 3, arranged to extend substantially vertically with respect to the fully closing release shaft 11. At a portion of this connect lever 30, the portion being lower than the fully closing release shaft 11, a lock pin sliding hole 31 is provided, and at a top end portion of the connect lever 30, an engagement step portion 32 is provided. The lock pin sliding hole 31 extends substantially in the radial direction with respect to the fully closing release shaft 11 and slidably supports a lock floating pin P1. The lock floating pin P1 protrudes towards the base plate 10 from the connect lever 30 and a distal end portion of the lock floating pin P1 is arranged in the lock control hole 21 of the release lever 20. The engagement step portion 32 is formed by notching a portion of the top end portion of the connect lever 30, the portion being positioned at a rear side of the vehicle.

The inside open lever 40 extends substantially upward from the fully closing release shaft 11. This inside open lever 40 is provided with a lever abutting portion 41 and a proof pin sliding hole 42. The lever abutting portion 41 is a portion protruding forward from the fully closing release shaft 11. The proof pin sliding hole 42 extends substantially in the radial direction with respect to the fully closing release shaft 11 and slidably supports a proof floating pin P2. The proof floating pin P2 protrudes towards the base plate 10 from the connect lever 30 and a distal end portion of the proof floating pin P2 is arranged, across the connect lever 30, in a proof control hole of a child proof lever 60.

The child proof lever 60 extends along a front-rear direction of the vehicle and is rotatably supported by the base plate 10 via a shaft portion 61 provided at a central portion of the child proof lever 60. The shaft portion 61 of the child proof lever 60 is arranged to be parallel with the fully closing release shaft 11 at a position at a more front side of the vehicle and upper than the fully closing release shaft 11.

In a control portion 62 arranged at a more rear side of the vehicle than the shaft portion 61 in the child proof lever 60, a proof control hole 63, in which the above described proof floating pin P2 of the inside open lever 40 is arranged, is provided. An operating portion 64 arranged at a more front side of the vehicle than the shaft portion 61 in the child proof lever 60 is externally exposed from a front end portion of the slide door SD and is able to be operated only when the slide door SD is open.

If the child proof lever 60 is rotated via the operating portion 64, the control portion 62 moves vertically and the proof floating pin P2 arranged in the proof control hole 63 moves vertically in the proof pin sliding hole 42 of the inside open lever 40. If the proof floating pin P2 is arranged at a lower end portion of the proof pin sliding hole 42, a shaft portion thereof is arranged at the engagement step portion 32 of the connect lever 30. Therefore, if the inside open lever 40 is rotated anticlockwise from this state, by the proof floating pin P2 abutting against the engagement step portion 32, the connect lever 30 rotates anticlockwise in association therewith. On the contrary, if the proof floating pin P2 is arranged at an upper end portion of the proof pin sliding hole 42, the proof floating pin P2 is positioned more radially outward than the engagement step portion 32 of the connect lever 30. Therefore, if the inside open lever 40 is rotated anticlockwise from this state, the proof floating pin P2 does not abut against the engagement step portion 32 and the connect lever 30 does not move in association therewith.

The outside handle lever 50 extends substantially vertically with respect to the fully closing release shaft 11, and a part of the outside handle lever 50, the part being lower than the fully closing release shaft 11, forms a shape that is bent towards the front of the vehicle. A third link member L3 and a fourth link member L4 are respectively connected, via long holes 51 and 52 formed along the front-rear direction of the vehicle, to a portion of the outside handle lever 50, the portion being lower than the fully closing release shaft 11. The third link member L3 connects to the outside door handle OH. When door opening operation is performed on the outside door handle OH, the outside handle lever 50 rotates anticlockwise in FIG. 3 via the third link member L3. The fourth link member L4 connects to a release actuator RA via a cancel mechanism CY. When the release actuator RA is driven to open the door, the outside handle lever 50 rotates anticlockwise in FIG. 3 via the fourth link member L4.

Between this outside handle lever 50 and the connect lever 30, protrusions 53 and 33 are provided to abut against each other, such that, only when the outside handle lever 50 rotates anticlockwise in FIG. 3, the connect lever 30 moves in association therewith.

Further, in the control unit 1, as illustrated in FIG. 2, FIG. 6, and FIG. 8 to FIG. 10, a sub plate 70 is provided at a position where the sub plate 70 covers a front upper portion of the base plate 10. The sub plate 70 has a sub cover portion 71 that covers a part of the base plate 10, and sub leg portions 72, 73, and 74 that extend toward the base plate 10 from the sub cover portion 71, and the sub plate 70 is installed, via the sub leg portions 72, 73, and 74, to the base plate 10 in a state where the sub cover portion 71 covers the front top portion of the base plate 10 and the fully closing release shaft 11. Although illustration thereof in the figures is omitted, the sub leg portion 72 provided at a top portion of the sub cover portion 71 is installed, together with the base plate 10, to an inner panel of the slide door SD. A fully opening latch release lever 80, an input support shaft 90, and a knob plate 100 are installed to this sub plate 70.

The fully opening latch release lever 80 extends substantially upwards from a fully opening release shaft 75 provided in the sub plate 70 and is able to rotate around an axis of the fully opening release shaft 75. A fifth link member L5 is connected to this fully opening latch release lever 80. The fifth link member L5 connects to the fully opening latch unit OL such that the fully opening latch unit OL performs release operation when the fully opening latch release lever 80 is rotated anticlockwise in FIG. 3.

The input support shaft 90 is an axial member formed with a spline at a distal end portion thereof, and is rotatably supported by the sub plate 70 via a proximal end portion thereof in a state where the distal end portion protrudes towards the inside of the vehicle. The spline of the input support shaft 90 is for attaching the inside door handle IH. That is, the input support shaft 90 is able to rotate in both clockwise direction and anticlockwise direction around its own axis with respect to the sub plate 70 by operation on the inside door handle IH. This input support shaft 90 is provided with a shaft interlocking member 91 at a portion extending through the sub plate 70 and protruding between the sub plate 70 and the base plate 10, and is provided with an inside handle lever (input lever) 110 at a part positioned between the sub plate 70 and the inside door handle IH, the part being in a portion that is inner in the vehicle than the sub plate 70.

Figure 7:
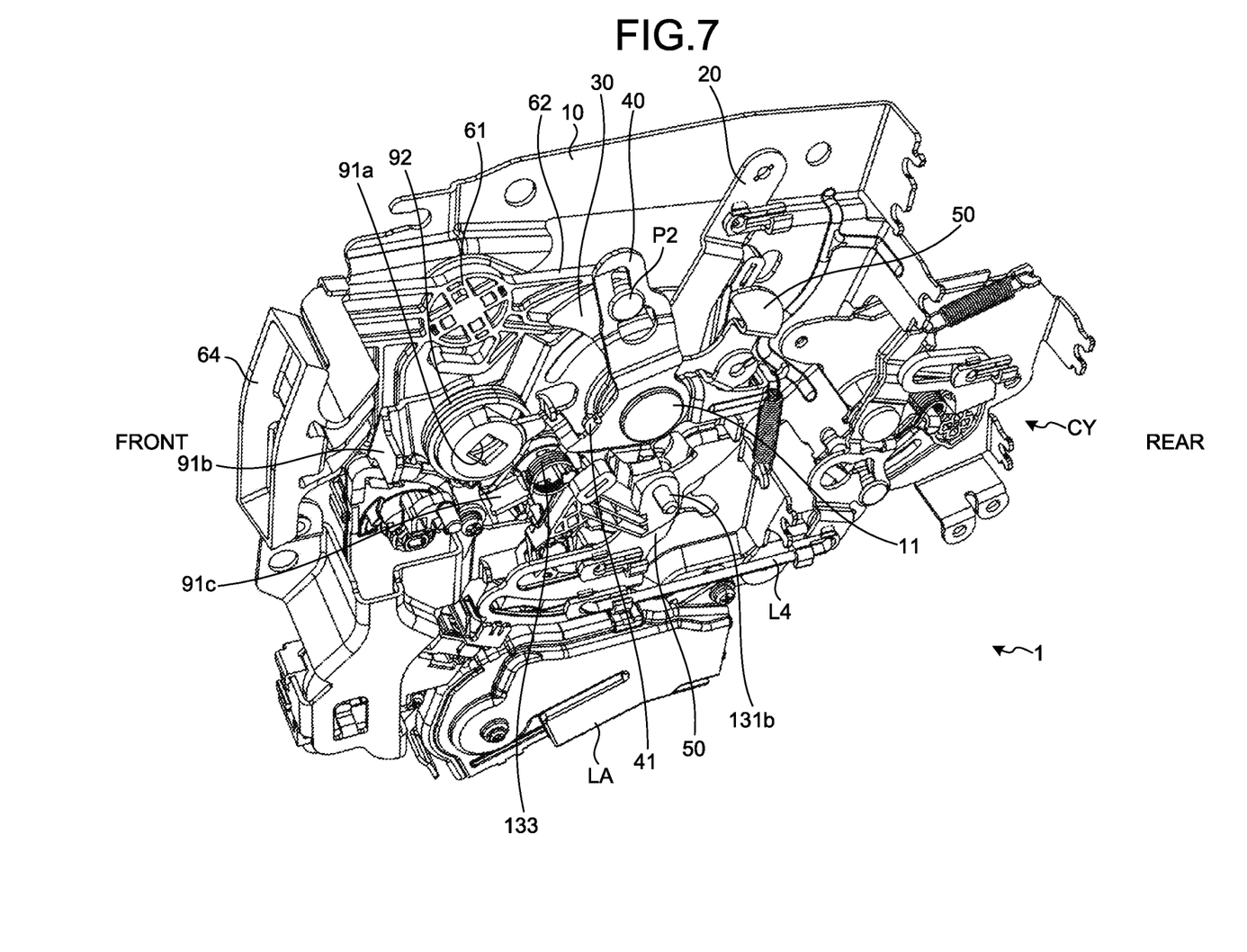
FIG. 7 is a perspective view of a state where a sub plate has been removed from the door opening and closing apparatus illustrated in FIG. 6.
Figure 8:
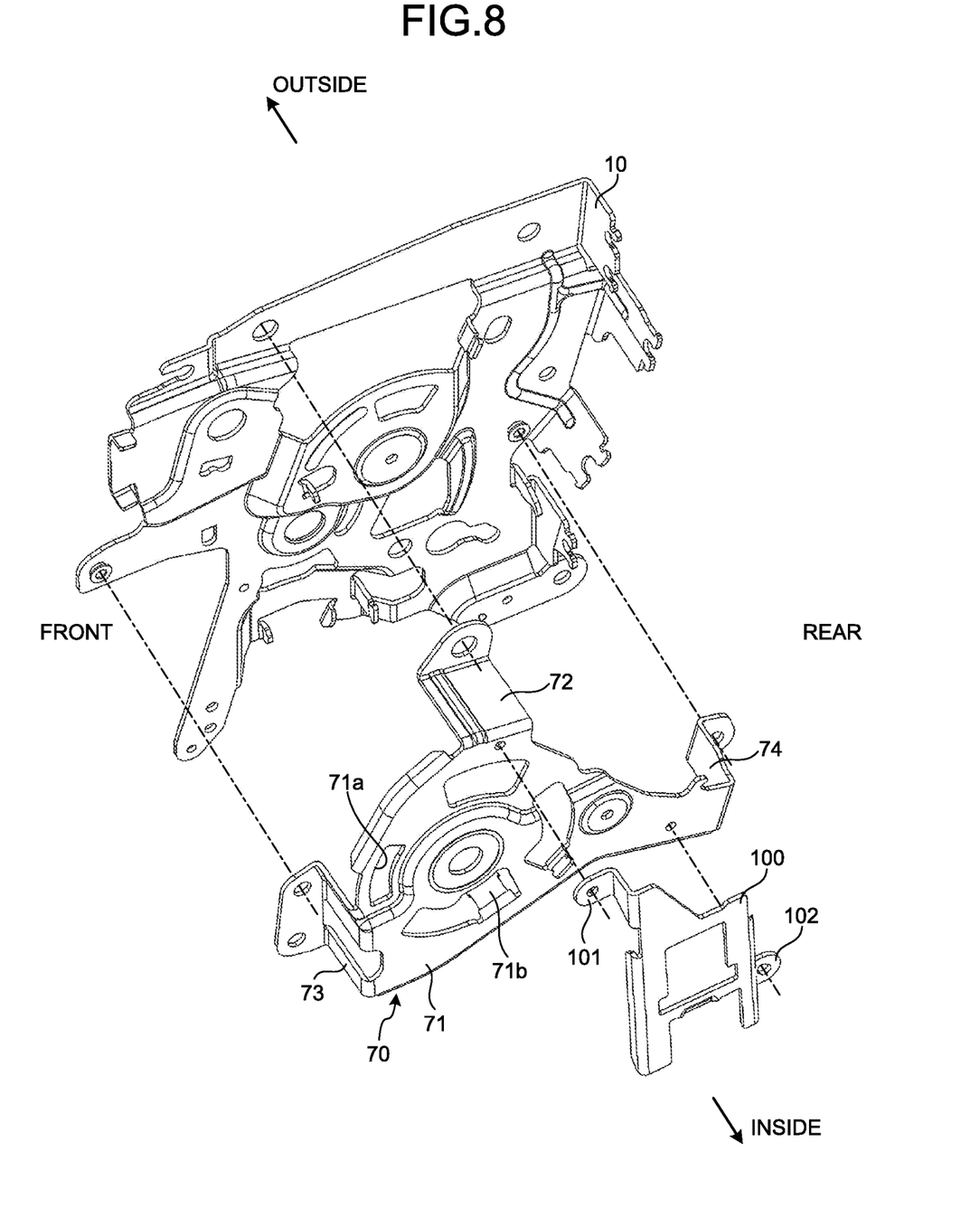
FIG. 8 is a perspective view illustrating only a base plate, the sub plate, and the knob plate of the door opening and closing apparatus illustrated in FIG. 2, which have been disassembled.
Figure 9:
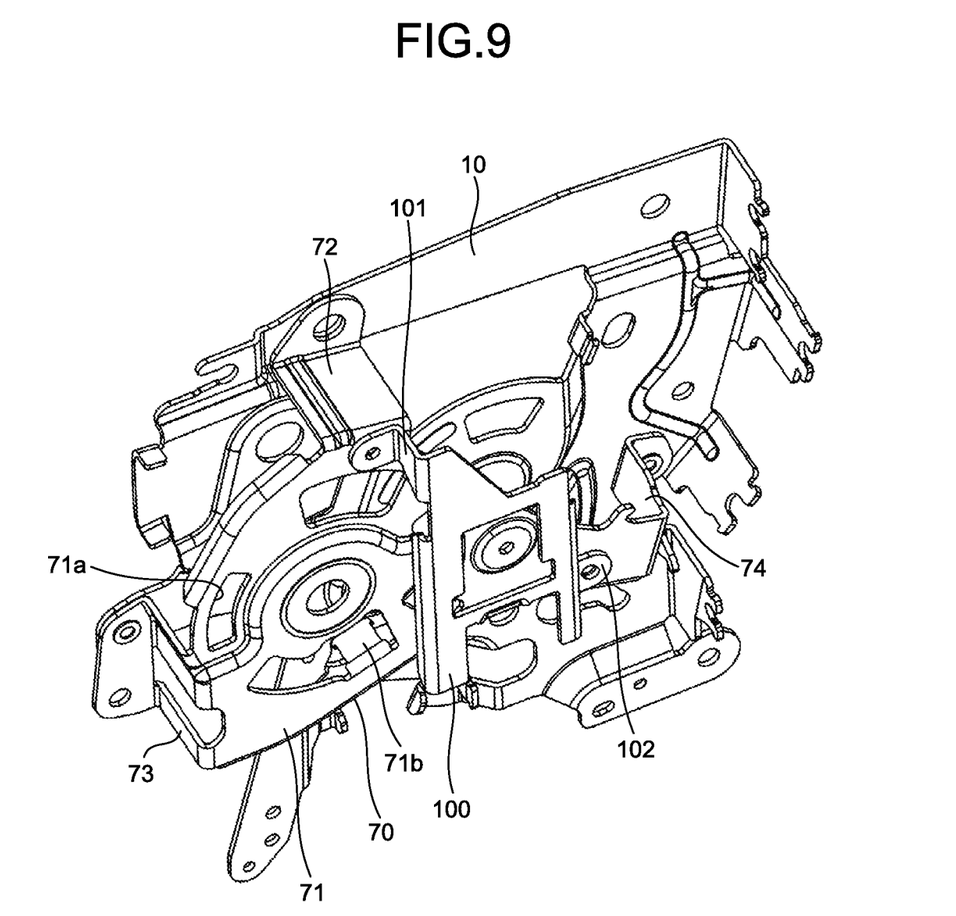
FIG. 9 is a perspective view of an assembled state of the base plate, the sub plate, and the knob plate illustrated in FIG. 8.
Figure 10:
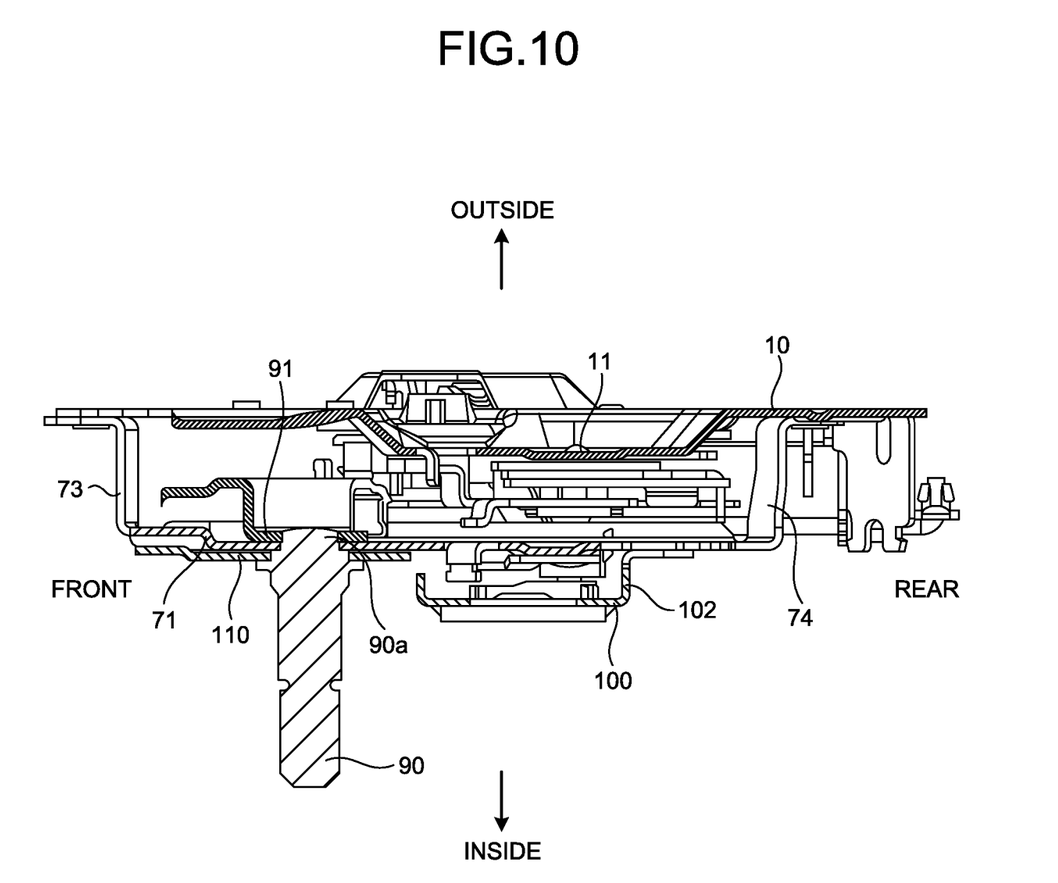
FIG. 10 is a cross sectional plan view of the door opening and closing apparatus illustrated in FIG. 2.

The shaft interlocking member 91 has, as illustrated in FIG. 2 and FIG. 7, a rectangular hole 91a at a central portion thereof, and by fitting a rectangular column portion 90a of the input support shaft 90 into this rectangular hole 91a, the shaft interlocking member 91 is installed to the input support shaft 90 to rotate integrally with the input support shaft 90. This shaft interlocking member 91 is provided with a lever linking protrusion 91b and a spring protrusion 91c.

The lever linking protrusion 91b is bent towards the inside of the vehicle from a portion of the shaft interlocking member 91, the portion protruding towards the front of the vehicle from the input support shaft 90, and the lever linking protrusion 91b protrudes towards the inside of the vehicle via an insertion hole 71a formed in the sub plate 70. The spring protrusion 91c is bent towards the inside of the vehicle from a portion protruding downwards from the input support shaft 90. A neutral return spring 92 is interposed between this spring protrusion 91c and the sub plate 70. Both end portions of a coil wound around in a coil shape of the neutral return spring 92 intersect each other and protrude to an outer periphery, and the neutral return spring 92 is attached to an outer peripheral portion of the input support shaft 90 via a portion wound around in a coil shape in a state where the spring protrusion 91c and a spring protrusion 71b of the sub plate 70 are interposed between both of these end portions of the coil. This neutral return spring 92 is brought into a bent state via the spring protrusion 91c when the input support shaft 90 rotates in any of the clockwise direction and anticlockwise direction. That is, when operational force is not placed on the inside door handle IH, the neutral return spring 92 functions to return the inside door handle IH to a neutral position via the shaft interlocking member 91 and the input support shaft 90.

The inside handle lever 110 is arranged to be rotatable around the axis of the input support shaft 90 with respect to the input support shaft 90. This inside handle lever 110 is provided with a linking lever portion 111, a door opening output lever portion 112, and a door closing output lever portion 113.

The linking lever portion 111 is a portion protruding towards the front of the vehicle from the input support shaft 90, and the lever linking protrusion 91b of the shaft interlocking member 91 extends through a linking hole 111a formed in a protruding end portion thereof. The door opening output lever portion 112 is a portion protruding towards the rear of the vehicle from the input support shaft 90. When the inside door handle IH is arranged at the neutral position, this door opening output lever portion 112 is positioned upper than the lever abutting portion 41 of the inside open lever 40, and when the inside door handle IH is rotationally operated in the clockwise direction, the door opening output lever portion 112 is able to abut against the lever abutting portion 41. The door closing output lever portion 113 is a fan shaped portion protruding upwards from the input support shaft 90. An arc long hole 113a, which has an arc shape centering around the input support shaft 90, is formed in this door closing output lever portion 113, and the door closing output lever portion 113 is connected to a sixth link member L6 via this arc long hole 113a. The sixth link member L6 connects between the door closing output lever portion 113 and the fully opening latch release lever 80. In this embodiment, the inside handle lever 110 is connected to the fully opening latch release lever 80 by the sixth link member L6 such that when the inside handle lever 110 rotates anticlockwise in FIG. 3, the fully opening latch release lever 80 immediately moves in association therewith.

The knob plate 100 is provided, as illustrated in FIG. 2, FIG. 5, and FIG. 8 to FIG. 10, at a position where the knob plate 100 covers a portion of the sub plate 70, the portion being at a more rear side of the vehicle than the input support shaft 90, and the knob plate 100 is installed to the sub plate 70 via knob leg portions 101 and 102 in a state where rotational ranges of the fully opening latch release lever 80 and the inside handle lever 110 are reserved. This knob plate 100 is arranged with a lock knob 120. The lock knob 120 is arranged to be slidingly operable along the vertical direction inside the vehicle.

Figure 11:
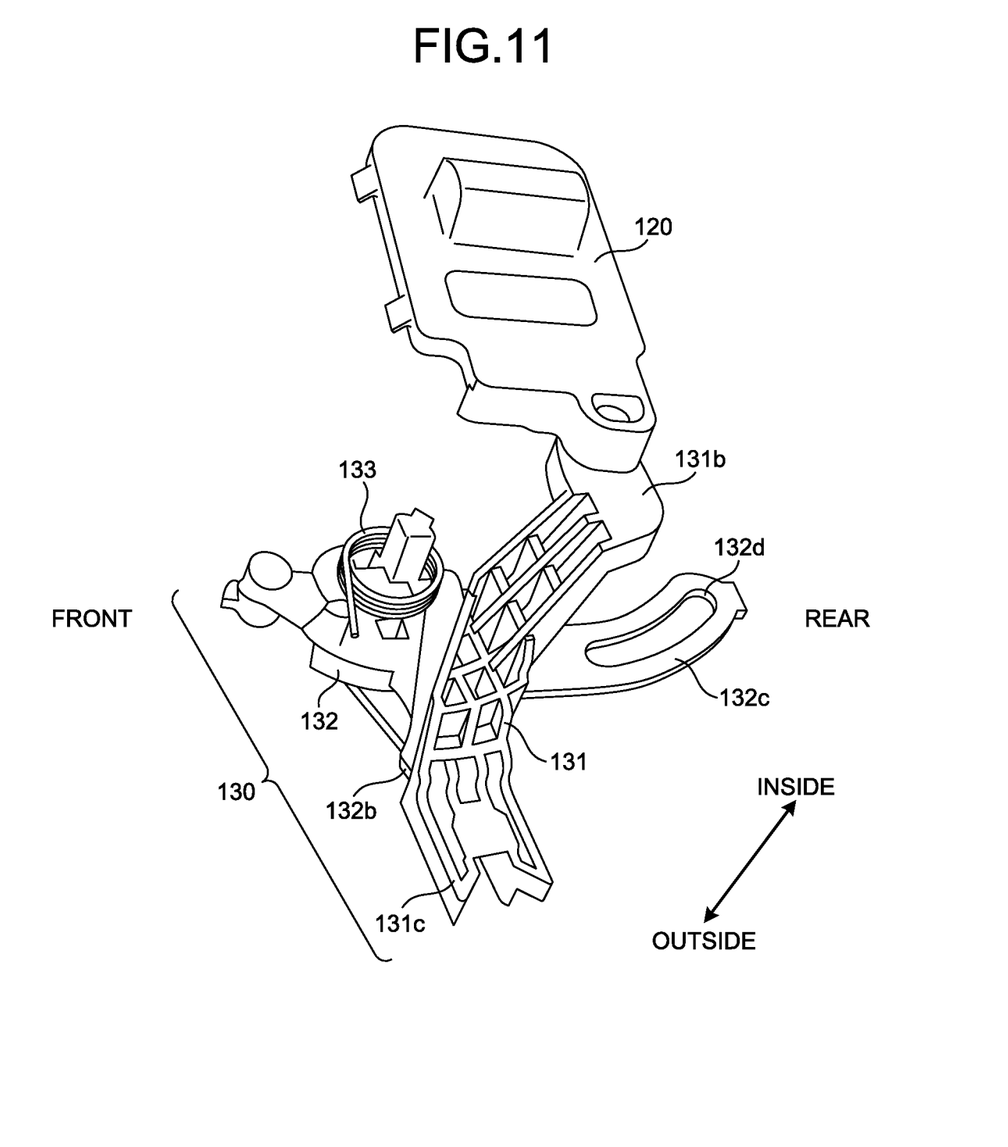
FIG. 11 is a perspective view of the lock mechanism of the door opening and closing apparatus illustrated in FIG. 2.

Further, a lock mechanism 130 is provided in the control unit 1, as illustrated in FIG. 4 and FIG. 11. The lock mechanism 130 prescribes a position of the lock floating pin P1 with respect to the lock pin sliding hole 31 of the connect lever 30, and includes a lock lever 131, a sub lock lever 132, and a lock linking spring 133.

The lock lever 131 is rotatably supported by the base plate 10 via a shaft portion 131a lower than the fully closing release shaft 11 and at a more front side of the vehicle. The lock lever 131 is provided with a knob linking portion 131b and an actuator linking portion 131c. The knob linking portion 131b is linked to a lower end portion of the lock knob 120 at a portion positioned at a more rear side of the vehicle than the shaft portion 131a. When the lock knob 120 slides upward, the lock lever 131 rotates anticlockwise in FIG. 3, and when the lock knob 120 slides downward, the lock lever 131 rotates clockwise in FIG. 3. The actuator linking portion 131c is a portion extending downwards from the shaft portion 131a. This actuator linking portion 131c is linked to a lock drive lever LAO of a lock actuator LA. The lock drive lever LAO operates such that a distal end portion thereof moves to the front and the rear of the vehicle by driving of the lock actuator LA.

The sub lock lever 132 is arranged between the lock lever 131 and the base plate 10, and by the shaft portion 131a of the lock lever 131 inserting into a shaft insertion hole 132a, the sub lock lever 132 is able to rotate about the shaft portion 131a of the lock lever 131. This sub lock lever 132 is provided with a lock lever linking portion 132b and a pin control lever portion 132c. The lock lever linking portion 132b is a portion extending downwards along the actuator linking portion 131c from the shaft portion 131a of the lock lever 131, and abuts against a selective abutting portion 131d of the lock lever 131. When the lock lever 131 rotates clockwise in FIG. 3, the selective abutting portion 131d causes the sub lock lever 132 to move in association therewith by abutting against the lock lever linking portion 132b. When the lock lever 131 rotates anticlockwise in FIG. 3, the selective abutting portion 131d separates from the lock lever linking portion 132b. The pin control lever portion 132c is a portion extending towards the rear of the vehicle from the shaft portion 131a of the lock lever 131 and has a switch-over control hole 132d. The switch-over control hole 132d is a long hole extending along the front-rear direction of the vehicle. In this switch-over control hole 132d, a distal end portion of the lock floating pin P1 that has passed the lock control hole 21 of the release lever 20 is arranged.

The lock linking spring 133 is interposed between the lock lever 131 and the sub lock lever 132, and places bias such that the lock lever linking portion 132b of the sub lock lever 132 abuts against the selective abutting portion 131d of the lock lever 131 at all times.

In this embodiment, when the lock knob 120 is slid downwards with respect to the knob plate 100, as illustrated in FIG. 4(a), the pin control lever portion 132c of the sub lock lever 132 is brought into a state of warping to the rear of the vehicle and being inclined downwards, and the lock floating pin P1 is arranged at the lock portion 21b of the lock control hole 21 formed in the release lever 20 (locked state). When the lock knob 120 is slid upwards with respect to the knob plate 100, as illustrated in FIG. 4(c), the pin control lever portion 132c of the sub lock lever 132 is brought into a substantially horizontal state by warping to the rear of the vehicle, and the lock floating pin P1 is arranged at the unlock portion 21a of the lock control hole 21 (unlocked state).

When the control unit 1 configured as described above is in an initial state, the inside door handle IH is arranged at the neutral position, and the door opening output lever portion 112 of the inside handle lever 110 is positioned separately from and upper with respect to the lever abutting portion 41 of the inside open lever 40. Further, the fully opening latch release lever 80 is arranged in a state of being rotated clockwise, by a return spring 81 interposed between the fully opening latch release lever 80 and the sub plate 70.

If the inside door handle IH is operated to open the door when, by sliding the lock knob 120 upwards with respect to the knob plate 100 (into the unlocked position), the lock floating pin P1 is arranged at the unlock portion 21a of the lock control hole 21 and the proof floating pin P2 is arranged, by the child proof lever 60, at a lower end portion of the proof pin sliding hole 42, the inside handle lever 110 rotates clockwise in FIG. 3 via the input support shaft 90 and the shaft interlocking member 91.

As a result, by the door opening output lever portion 112 of the inside handle lever 110 abutting against the lever abutting portion 41 of the inside open lever 40, the inside open lever 40 rotates anticlockwise in FIG. 3, and the connect lever 30 rotates in the same direction via the proof floating pin P2. The rotation of the connect lever 30 is transmitted to the release lever 20 via the lock floating pin P1, and by the release lever 20 rotating anticlockwise, the front fully closing latch unit FL and the rear fully closing latch unit RL are respectively release operated. Therefore, even if the slide door SD is in a fully closed state, the slide door SD is able to be opened by the door opening operation on the inside door handle IH.

In a state where the proof floating pin P2 has been arranged, by the child proof lever 60, at a top end portion of the proof pin sliding hole 42, even if the inside door handle IH is operated to open the door, rotation of the inside open lever 40 is not transmitted to the connect lever 30 and thus the front fully closing latch unit FL and the rear fully closing latch unit RL are not able to be release operated and the slide door SD is not able to be opened either.

Further, if the outside door handle OH is operated to open the door or if the release actuator RA is driven to open the door, in a state where the lock floating pin P1 has been arranged at the unlock portion 21a of the lock control hole 21 by the lock knob 120 being slid upwards with respect to the knob plate 100, the outside handle lever 50 rotates anticlockwise in FIG. 3 and the connect lever 30 rotates in the same direction along therewith. Therefore, even if the slide door SD is in the fully closed state, if the outside door handle OH is operated to open the door, or if the release actuator RA is driven to open the door, regardless of the position of the proof floating pin P2, the slide door SD becomes able to be opened.

On the contrary, in a state where the lock floating pin P1 has been arranged at the lock portion 21b of the lock control hole 21 by the lock knob 120 being slid downwards with respect to the knob plate 100 (into the locked position), even if the inside door handle IH is operated to open the door, rotation of the connect lever 30 is not transmitted to the release lever 20 and thus the front fully closing latch unit FL and the rear fully closing latch unit RL are unable to be release operated and the slide door SD is also unable to be opened.

Similarly, in a state where the lock floating pin P1 has been arranged at the lock portion 21b of the lock control hole 21 by the lock knob 120 being slid downwards with respect to the knob plate 100, even if the outside door handle OH is operated to open the door or the release actuator RA is driven to open the door, rotation of the connect lever 30 is not transmitted to the release lever 20 and thus the slide door SD is unable to be opened.

The above described state is released if the lock knob 120 is slid upwards or the lock actuator LA is driven and the lock floating pin P1 is moved to the unlock portion 21a of the lock control hole 21, and the slide door SD becomes able to be opened again by door opening operation on the inside door handle IH or outside door handle OH.

As illustrated in FIG. 4(a), if the inside door handle IH or outside door handle OH is operated to open the door in a state where the lock knob 120 has been arranged at the locked position, by rotation of the connect lever 30, the lock floating pin P1 is arranged at a portion of the lock portion 21b of the lock control hole 21, the portion being at a rear side of the vehicle, and thus even if the lock knob 120 is directly slid to the unlocked position, the lock floating pin P1 is unable to be moved to the unlock portion 21a of the lock control hole 21.

However, in the above described control unit 1, since the sub lock lever 132 where the lock floating pin P1 is arranged and the lock lever 131 directly operated by the lock knob 120 are configured as separate bodies, as illustrated in FIG. 4(b), the lock knob 120 is able to be slid upwards in a state where the lock floating pin P1 has been arranged at the lock portion 21b of the lock control hole 21, and thereafter, at a time point at which the door opening operation on the inside door handle IH or outside door handle OH is stopped, by spring force of the lock linking spring 133, as illustrated in FIG. 4(c), the lock floating pin P1 becomes able to be arranged at the unlock portion 21a of the lock control hole 21.

When the inside door handle IH is operated to open the door, and the inside handle lever 110 is rotated anticlockwise in FIG. 3 via the input support shaft 90 and the shaft interlocking member 91, the fully opening latch release lever 80 rotates anticlockwise in FIG. 3 via the fifth link member L5 at all times. Therefore, if door closing operation is performed on the inside door handle IH when the slide door SD is in a fully opened state, for example, the fully opening latch unit OL is release operated and the slide door SD becomes able to be closed.

In this control unit 1, as described above, the input support shaft 90 is installed to the base plate 10 via the sub plate 70. Therefore, while sufficiently reserving an amount of protrusion to the inside of the vehicle, the whole length of the input support shaft 90 is able to be shortened. Thereby, without increasing plate thickness of the base plate 10, the input support shaft 90 is able to be prevented from being inclined when the inside door handle IH is operated, and thus there is no risk of a problem, such as increase in weight of the base plate 10 and sub plate 70 or decrease in formability, being caused. What is more, any plate having a size that covers a part of the base plate 10 is sufficient as the sub plate 70 and there is no risk of the weight being increased.

Furthermore, since the knob plate 100 is arranged on the base plate 10 via the sub plate 70, the lock knob 120 is able to be provided at a position where the lock knob 120 overlaps with the inside handle lever 110, the release lever 20, the connect lever 30, the inside open lever 40, and the outside handle lever 50, and not only the freedom of designing is increased but also downsizing of the control unit 1 is able to be achieved.

REFERENCE SIGNS LIST

10 BASE PLATE
20 RELEASE LEVER
70 SUB PLATE
90 INPUT SUPPORT SHAFT
90a RECTANGULAR COLUMN PORTION
91 SHAFT INTERLOCKING MEMBER
110 INSIDE HANDLE LEVER
111 LINKING LEVER PORTION
111a LINKING HOLE
BD VEHICLE BODY
IH INSIDE DOOR HANDLE
FL FRONT FULLY CLOSING LATCH UNIT
RL REAR FULLY CLOSING LATCH UNIT
SD SLIDE DOOR

The invention claimed is:

1. A vehicle door opening and closing apparatus, which is an apparatus configured for installation in a door of a vehicle, the vehicle door opening and closing apparatus comprising:
a base plate having a shaft mounted thereon;
an output lever configured to rotate around the shaft and configured to, when being rotated in a predetermined direction and when the vehicle door opening and closing apparatus is installed in the door of the vehicle, set latch units provided between a vehicle body of the vehicle and the door, to a release state which allows the door to separate from the vehicle body of the vehicle;
a sub plate, including a sub cover portion, which partially covers an upper part of the base plate, and a plurality of sub leg portions, which extend toward the base plate from the sub cover portion and mount on the base plate, and configured to form a space, between the base plate and the sub plate, in which the output lever is provided;

an input support shaft configured to rotate with respect to the sub plate and to support an inside door handle arranged on an inner side of the vehicle when the vehicle door opening and closing apparatus is installed in the door of the vehicle; and an input lever, arranged on the input support shaft, configured to rotate when a door opening operation is performed on the inside door handle when the vehicle door opening and closing apparatus is installed in the door of the vehicle, wherein when the input lever is rotated by the door opening operation of the inside door handle when the vehicle door opening and closing apparatus is installed in the door of the vehicle, the rotation of the input lever is transmitted, via a transmission mechanism, to rotate the output lever to set the latch units to the release state.

2. The vehicle door opening and closing apparatus according to claim 1, wherein the sub plate is installed, together with the base plate, to a panel of the door.

3. The vehicle door opening and closing apparatus according to claim 1, wherein the input support shaft:

has a protruding portion extending through the sub plate and between the sub plate and the base plate;

includes a shaft interlocking member that is provided on the protruding portion and integrally rotates with the input support shaft; and rotatably supports the input lever, and the input lever is caused to rotate integrally with the input support shaft by the shaft interlocking member being engaged with the input lever.

* * * * *